(12) United States Patent
Mulligan et al.

(10) Patent No.: US 7,678,531 B2
(45) Date of Patent: Mar. 16, 2010

(54) POSITIVE-WORKING IMAGEABLE ELEMENTS

(75) Inventors: James L. Mulligan, Fort Collins, CO (US); Eric Clark, Loveland, CO (US)

(73) Assignee: Eastman Kodak Company, Rochester, NY (US)

( * ) Notice: Subject to any disclaimer, the term of this patent is extended or adjusted under 35 U.S.C. 154(b) by 405 days.

(21) Appl. No.: 11/668,502

(22) Filed: Jan. 30, 2007

(65) Prior Publication Data

US 2008/0182206 A1   Jul. 31, 2008

(51) Int. Cl.
*G03F 7/004* (2006.01)
*G03F 7/30* (2006.01)

(52) U.S. Cl. .................. 430/270.1; 430/302; 430/330

(58) Field of Classification Search ............ 430/270.1, 430/302, 330; 101/459, 467
See application file for complete search history.

(56) References Cited

U.S. PATENT DOCUMENTS

| | | | | |
|---|---|---|---|---|
| 5,169,897 A | * | 12/1992 | Walls | 525/61 |
| 5,169,898 A | * | 12/1992 | Walls et al. | 525/61 |
| 5,219,699 A | * | 6/1993 | Walls et al. | 430/156 |
| 5,262,270 A | * | 11/1993 | Walls | 430/156 |
| 6,143,464 A | | 11/2000 | Kawauchi | 430/270.1 |
| 6,255,033 B1 | | 7/2001 | Levanon et al. | 430/275.1 |
| 6,506,536 B2 | | 1/2003 | Pappas et al. | 430/270.1 |
| 6,858,359 B2 | | 2/2005 | Kitson et al. | 430/14 |
| 6,902,860 B2 | | 6/2005 | Asawa et al. | 430/270.1 |
| 6,911,296 B2 | | 6/2005 | Pappas et al. | 430/270.1 |
| 2002/0150833 A1 | | 10/2002 | Pappas et al. | 430/270.1 |
| 2004/0013965 A1 | | 1/2004 | Memetea et al. | 430/165 |
| 2004/0023155 A1 | | 2/2004 | Hayakawa et al. | 430/271.1 |
| 2005/0003296 A1 | | 1/2005 | Memetea et al. | 430/270.1 |
| 2006/0130689 A1 | | 6/2006 | Muller et al. | 101/453 |

FOREIGN PATENT DOCUMENTS

| | | |
|---|---|---|
| JP | 2005-215651 | 8/2005 |
| JP | 2005-215652 | 8/2005 |
| JP | 2005-250037 | 9/2005 |
| WO | WO 98/14504 | 4/1998 |
| WO | 2004/066026 | 8/2004 |
| WO | 2005/123412 | 12/2005 |

* cited by examiner

*Primary Examiner*—John S Chu
(74) *Attorney, Agent, or Firm*—J. Lanny Tucker

(57) ABSTRACT

Positive-working imageable elements have a substrate and an imageable layer that can be used to prepare lithographic printing plates. The imageable elements also include a radiation absorbing compound, and a mixture of first and second polymers in the same imageable layer. The first polymer has two or more centered H-bonds (hydrogen bonds) within a non-covalently bonded unit, and the second polymer is a polyvinyl acetal. This mixture of polymers in the same imageable layer provides improved solvent resistance and processing latitude without a loss in imaging speed.

15 Claims, No Drawings

POSITIVE-WORKING IMAGEABLE ELEMENTS

FIELD OF THE INVENTION

This invention relates to positive-working imageable elements having improved chemical resistance and improved processing latitude. This invention also relates to methods of imaging to provide positive-working imaged elements such as lithographic printing plates.

BACKGROUND OF THE INVENTION

In conventional or "wet" lithographic printing, ink receptive regions, known as image areas, are generated on a hydrophilic surface. When the surface is moistened with water and ink is applied, the hydrophilic regions retain the water and repel the ink, and the ink receptive regions accept the ink and repel the water. The ink is transferred to the surface of a material upon which the image is to be reproduced. For example, the ink can be first transferred to an intermediate blanket that in turn is used to transfer the ink to the surface of the material upon which the image is to be reproduced.

Imageable elements useful to prepare lithographic printing plates typically comprise an imageable layer applied over the hydrophilic surface of a substrate. The imageable layer includes one or more radiation-sensitive components that can be dispersed in a suitable binder. Alternatively, the radiation-sensitive component can also be the binder material. Following imaging, either the imaged regions or the non-imaged regions of the imageable layer are removed by a suitable developer, revealing the underlying hydrophilic surface of the substrate. If the imaged regions are removed, the element is considered as positive-working. Conversely, if the non-imaged regions are removed, the element is considered as negative-working. In each instance, the regions of the imageable layer (that is, the image areas) that remain are ink-receptive, and the regions of the hydrophilic surface revealed by the developing process accept water and aqueous solutions, typically a fountain solution, and repel ink.

Direct digital imaging has become increasingly important in the printing industry. Imageable elements for the preparation of lithographic printing plates have been developed for use with infrared lasers. Thermally imageable, multi-layer elements are described, for example, U.S. Pat. No. 6,294,311 (Shimazu et al.), U.S. Pat. No. 6,352,812 (Shimazu et al.), U.S. Pat. No. 6,593,055 (Shimazu et al.), U.S. Pat. No. 6,352,811 (Patel et al.), U.S. Pat. No. 6,358,669 (Savariar-Hauck et al.), and U.S. Pat. No. 6,528,228 (Savariar-Hauck et al.), U.S. Patent Application Publication 2004/0067432 A1 (Kitson et al.). U.S. Patent Application Publication 2005/0037280 (Loccufier et al.) describes heat-sensitive printing plate precursors that comprise a phenolic developer-soluble polymer and an infrared radiation absorbing agent in the same layer.

Single-layer positive-working imageable elements are described in the art having chemical resistant formulations include novolak resins in the imageable layers. Other useful imaging formulations are described in U.S. Patent Applications 2004/0013965 (Memetea et al.) and 2005/0003296 (Memetea et al.), and U.S. Pat. No. 6,255,033 (Levanon et al.) that describes the use of polymers having pendant acetal groups (that is, polyvinyl acetals) to prepare photoresists.

U.S. Pat. No. 6,143,464 (Kawauchi) describes positive-working photosensitive compositions containing a blend of phenolic resins and a copolymer derived from acrylic monomers with pendant sulfonamide groups. These compositions are used to prepare single-layer imageable elements.

U.S. Pat. No. 6,506,536 (Pappas et al.) describes the use of "quaternary hydrogen bonded entities" (QHBE) to modify novolak resins also provide some chemical resistance in imageable layer formulations.

Problem to be Solved

In use, imaged lithographic printing plates (both negative- and positive-working) come into contact with developer solutions, fountain solutions, and inks. In addition, the elements may be subjected to blanket washes to remove inks and various cleaning solutions for blanket and press rollers.

As noted above, single-layer positive-working imageable elements are known in the art and several such elements are commercially available including those sold under the tradename Electra Excel and Kodak Positive Thermal Plate PTP (Eastman Kodak Company, Norwalk, Conn.). Some of these elements have excellent chemical and solvent resistance but have poor processing latitude while others are less chemical and solvent resistant but provide excellent processing latitude. Thus, while the various imageable elements have advantageous properties, there is a continuing need to improve on the various properties of such elements and especially to achieve both increased chemical solvent resistance as well as improved processing latitude without a significant loss in imaging speed.

SUMMARY OF THE INVENTION

The present invention provides a positive-working imageable element comprising a substrate having thereon an imageable layer, the element further comprising a radiation absorbing compound, wherein the imageable layer comprises first and second polymers, the first polymer is an alkaline soluble polymer that comprises: (1) at least one covalently bonded unit that is derived from a polyfunctional material that is soluble or dispersible in an aqueous developer, and (2) at least one thermally reversible non-covalently bonded unit that includes a two or more centered H-bonds within that unit, and the second polymer is a polyvinyl acetal in which at least 50% of the recurring units are acetal units.

Further, this invention provides a composition comprising the first and second polymers noted above wherein the weight ratio of the first polymer to the second polymer is at least 1:1.

This invention also provides a method for forming an image comprising:

A) thermally imaging the imageable element of this invention, thereby forming an imaged element with exposed and non-exposed regions, and B) contacting the imaged element with an alkaline developer to remove only the exposed regions.

The imageable elements of this invention have various improved properties including improved resistance to various chemicals and solvents used in lithographic imaging and printing, while providing desired processing latitude. These advantages are achieved without a significant loss in imaging speed because of the presence of the blend of specific first and second polymers. The first polymer is a QHBE-modified resin, such as a QHBE-modified novolak, and the second polymer is a polyvinyl acetal. In most embodiments, there is a single imageable layer comprising the mixture of first and second polymers.

DETAILED DESCRIPTION OF THE INVENTION

Definitions

Unless the context indicates otherwise, when used herein, the terms "composition", "imageable element", "positive-working imageable element", and "printing plate precursor" are meant to be references to embodiments of the present invention.

By "single-layer" imageable element, we mean an imageable element of this invention that has only a single layer needed for providing a positive image. In such embodiments, the blend or mixture of first and second polymers (defined below) would be located in this single imaging layer that is usually the outermost layer. However, such elements may comprise additional non-imaging layers [such as subbing layers or an overcoat comprising an oxygen-impermeable, water-soluble polymer such as a poly(vinyl alcohol)] on either side of the substrate.

In addition, unless the context indicates otherwise, the various components described herein such as "first polymer", "second polymer", "radiation absorbing compound", and similar terms also refer to mixtures of such components. Thus, the use of the article "a" or "an" is not necessarily meant to refer to only a single component.

By the term "remove said exposed regions" during development, we mean that the exposed regions of the imageable layer and any underlying layers are selectively and preferentially removed by the developer.

Unless otherwise indicated, percentages refer to percents by dry weight.

For clarification of definitions for any terms relating to polymers, reference should be made to "Glossary of Basic Terms in Polymer Science" as published by the International Union of Pure and Applied Chemistry ("IUPAC"), *Pure Appl. Chem.* 68, 2287-2311 (1996). However, any definitions explicitly set forth herein should be regarded as controlling.

Unless otherwise indicated, the term "polymer" refers to high and low molecular weight polymers including oligomers and includes homopolymers and copolymers.

The term "copolymer" refers to polymers that are derived from two or more different monomers. That is, they comprise recurring units having at least two different chemical structures.

The term "backbone" refers to the chain of atoms in a polymer to which pendant groups can be attached. An example of such a backbone is an "all carbon" backbone obtained from the polymerization of one or more ethylenically unsaturated polymerizable monomers. However, other backbones can include heteroatoms wherein the polymer is formed by a condensation reaction or some other means.

"H-bond" refers to "hydrogen bond".

Uses

The positive-working imageable elements can be used to provide imaged elements for various purposes. One use is as lithographic printing plate precursors as described in more detail below. However, this is not meant to be the only use of the present invention. For example, the imageable elements can also be used as thermal patterning systems and to form masking elements and printed circuit boards.

First and Second Polymers

The composition and an imageable layer of the imageable element include a mixture of one or more "first" and one or more "second" polymers. Generally, these polymers are present at a weight ratio of the first polymer(s) to the second polymer(s) of at least 1:1 (more typically from about 1:1 to about 15:1). Thus, the first and second polymers are in the same imageable layer. These first and second polymers are present in a total dry coverage of from about 50 to 99 weight % (more typically from about 75 to about 97 weight %), based on total dry weight of the composition or imageable layer.

The first polymer useful in this invention comprises: (1) at least one covalently bonded unit that is derived from a polyfunctional material that is soluble or dispersible in an aqueous developer, and (2) at least one thermally reversible non-covalently bonded unit that includes a two or more centered H-bonds within that unit. Generally, the thermally reversible non-covalently bonded unit is a two-, three, or four-centered H-bonded unit, and in some embodiments, the two or more centered H-bond is a four centered H-bond.

In one embodiment, the thermally reversible non-covalently bonded unit includes a two-centered H-bonded unit that comprises two pyridone groups. In another embodiment, the thermally reversible non-covalently bonded unit includes a three-centered H-bonded unit that comprises a cyclic imide group and a 2,6-diaminotriazine groups. In still other embodiments, the thermally reversible non-covalently bonded unit includes a four-centered H-bonded unit that comprises at least two isocytosine groups.

The term "unit" in the context of this invention refers to any chemical group, moiety of functionality. Examples of such units include covalently bonded units, such as those derived from novolak resins, and non-covalently bonded units, that is, two or more centered H-bond links such as those derived from four-centered H-bonded units.

Such 4-centered H-bonded units have a structure resulting from association of the two sites capable of quadruple hydrogen bonding, namely two isocytosine units. The association of the two quadruple hydrogen bonding sites and the quadruple hydrogen bonded unit resulting therefrom, that is, the 4-centered H-bonded unit, is schematically represented below for the "keto" tautomer, which is one of the two possible tautomeric forms of the isocytosine ring system. The schematic representation is for an isocytosine having the substituent —CH$_2$CH$_2$CH$_2$—R:

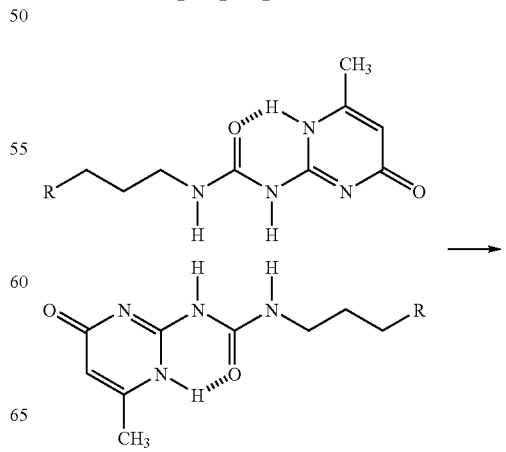

-continued

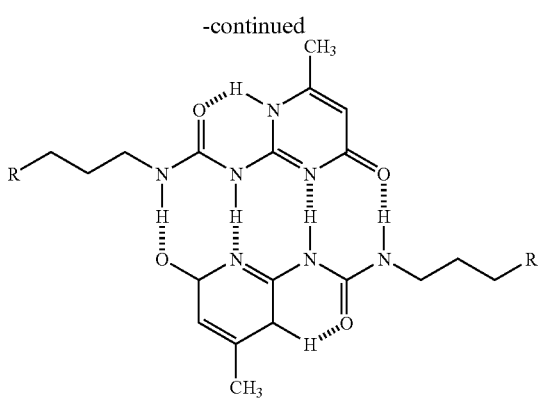

wherein R is hydrogen or any suitable radical.

The 4-centered H-bonded unit can result from the association of two sites that are in the "enol" tautomeric form in which the hydrogen is on the oxygen atom instead of being on the nitrogen. The "keto" and "enol" tautomeric forms of the isocytosine derivative are described and proposed structures shown in WO 98/014504 (Subesma et al.), the contents of which are incorporated herein by reference. Accordingly, whenever a compound is represented by the "keto" form, it should be understood that the actual compound can exist in either the "keto" or "enol" tautomeric forms, or in a combination of both tautomeric forms.

As an example, the formation of such 4-centered H-bonded unit resulting from a 4-centered H-bonding interaction of two 6-methylisocytosinyl groups, each attached to an R group, is schematically represented as follows:

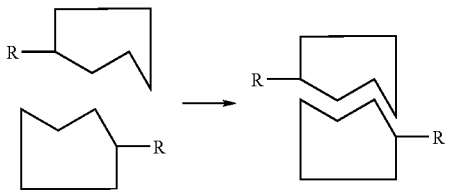

The "first" polymer according to the present invention may be identified as a "supramolecular polymer", which refers to a polymer that derives its polymeric properties from a combination of covalent bonds and specific secondary interactions, including hydrogen bonding, and particularly two or more centered H-bond links. Such secondary interactions provide high bond strength and contribute substantially to the polymeric properties. This first polymer may also be thermally-sensitive, meaning that the polymer becomes more soluble in alkaline developer when it is heated.

The non-covalently bonded unit according to this invention includes at least a two-centered H-bond within each unit. More typically, the non-covalently bonded unit includes a two-, three-, or four-centered H-bond within each unit. H-bonds that are higher than four-centered can also be used.

In addition to the two or more centered H-bonding, the non-covalently bonded unit in the first polymer includes one or more additional secondary interactions, such as van der Waals associations, hydrophobic associations, ionic associations, or a combination thereof. Furthermore, in addition to the two or more centered H-bonded units, the thermally sensitive polymer itself can have additional intermolecular or intramolecular interactions, including intermolecular or intramolecular H-bonding.

In generally, the first polymer also has at least one base-soluble functional group having a pKa of less than 14. Such base-soluble functional groups include but are not limited to, carboxy, sulfo, imide, N-acyl sulfonamide, and phenolic hydroxyl groups.

Bifunctional compounds that can associate into an oligomer or polymer by two-centered H-bond units are described in *J. Org. Chem.*, 53, 5787-9 (1988). Representative of the compounds that can associate into an oligomer or polymer by two-centered H-bond units are bridged bipyridone derivatives provided that such systems have at least one base-soluble functional group as noted above. Polymers based on three-centered H-bond units are described in *Macromolecules*, 28, 782-83 (1995). These two publications are incorporated herein by reference in their entirety.

Other embodiments comprise non-covalently bonded units that are capable of forming one or more three-centered H-bonds with another of the same or different group to form a three-centered H-bond pair. In one embodiment, the first polymer is derived from maleimide/styrene copolymers associated with 4-vinyl-2,6-diaminotriazine/styrene copolymers. Terpolymers thereof are also suitable for this use.

In most embodiments, the first polymer is an alkaline soluble polymer that comprises recurring units having pendant groups represented by the following Structure (I):

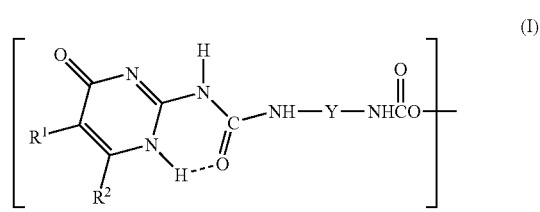

wherein $R^1$ and $R^2$ are independently hydrogen or hydrocarbyl, and Y is a hydrocarbylene derived from a diisocyanate having the formula $Y(NCO)_2$. Such alkaline soluble polymers can have the same or different pendant groups represented by Structure (I). Such polymers can comprise recurring units of which from about 1 to about 20 mol %, or from about 1 to about 10 mol % have such pendant groups.

The first polymer used in this invention can actually be a mixture of polymers having different amounts of the pendant groups of Structure (I), and such mixtures can include polymers having no pendant groups of Structure (I) as long as at least one of the polymers in the mixture has such pendant groups.

Generally, the first polymer having the noted pendant groups is derived from a polyfunctional phenolic resin that has multiple phenolic recurring units, which units then have a phenolic group with one or more hydroxyl groups attached to the phenyl ring. For example, such polyfunctional resins could be a phenol/cresol novolak, polyvinyl phenolic polymer, vinyl phenol/hydrocarbyl acrylate copolymer, or a combination thereof, the diisocyanate is isophorone diisocyanate, methylene-bis-phenyl diisocyanate, toluene diisocyanate, hexamethylene diisocyanate, tetramethylxylylene diisocyanate, dimers thereof, adducts with diols, and combinations thereof. Because the polyfunctional phenolic resin has recurring units with one or more functional groups, one or more hydroxyl groups can react with an equal number of isocyanate functional groups, each attached to a site bearing a non-covalently bonded unit. More typically, the polyfunctional phenolic resin is a phenol/cresol novolak.

Descriptions of the preferred isocytosine/isocyanate mono-adduct and bi-adduct are provided in Col. 9 (line 1) to Col. 10 (line 12) of U.S. Pat. No. 6,506,536 (noted above), which descriptions are incorporated herein by reference.

The term "hydrocarbyl" refers to a linear, branched, or cyclic alkyl, alkenyl, aryl, alkaryl group having 1 to 22 carbon atoms that can be unsubstituted or substituted with one or more halo, hydroxyl, hydrocarbyloxy, carboxy, ester, ketone, cyano, amino, amido, or nitro groups. Hydrocarbyl groups in which the carbon chain is interrupted by oxygen, nitrogen, or sulfur are also included in the term "hydrocarbyl" for purposes of this invention.

The term "hydrocarbylene" refer to a linear, branched, or cyclic alkylene, vinylene, arylene, aralkylene, or alkarylene group having 1 to 22 carbon atoms (depending upon the type of group) in the chain that can be unsubstituted or substituted with one or more halo, hydroxyl, carboxy, hydrocaryloxy, ester, ketone, cyano, amino, amido, or nitro groups. Hydrocarbylene groups in which the carbon chain is interrupted by oxygen, nitrogen, or sulfur are also included in the term "hydrocarylene" for purposes of this invention.

The covalently bonded unit according to the present invention is derived from a polyfunctional material covalently bonded to sites that are also bonded to the non-covalently bonded units. At least one, and more typically more than one, of the same or different polyfunctional materials can be bonded to such sites. The first polymer can be any polymer or resin that is capable of producing properties required for thermal imaging. For example, to achieve developability, the polyfunctional material can have at least one base-soluble functional group having a pKa of less than 14. Such base-soluble functional groups include but are not limited to, carboxy, sulfo, imide, N-acyl sulfonamide, and phenolic hydroxyl groups. Such polyfunctional materials include but are not limited to, polyfunctional phenolic resins, acrylic resins, polyester resins, polyurethane resins, and combinations thereof. More typically, the covalently bonded unit is derived from a phenol/cresol novolak, polyvinyl phenol polymer vinyl phenol/hydrocarbyl acrylate copolymers or a mixture thereof.

The first polymer can have a weight average molecular weight ($M_w$) of at least 500 and up to 60,000, and preferably from about 1,000 to about 4,000, as determined by Size Exclusion Chromatography.

The first polymer can be prepared using known procedures, such as those described in U.S. Pat. No. 6,506,536 (noted above). For example, preparation of the preferred first polymers can be achieved by reaction of 1 mole of an isocytosine derivative with 1 mole of a diisocyanate (such as isophorone diisocyanate) to produce the isocytosine/isocyanate 1:1 adduct, which will spontaneously dimerize to form a dimeric mono-adduct having a thermally reversible four-centered H-bond. The resulting dimeric mono-adduct has free isocyanate groups on each end. This dimeric mono-adduct can then be used to form thermally reversible crosslinks with phenolic polymers. Any unreacted diisocyanate can also crosslink the phenolic polymers, however, such crosslinking is not reversible. Thus, an excess of isocytosine may be used to further react with the mono-adduct, which can also dimerize spontaneously to give a diisocyanate bis-adduct having two or more thermally reversible four-centered H-bonds. This reaction is depicted schematically in Col. 10 (lines 30-60) of U.S. Pat. No. 6,506,536 (noted above) that is incorporated herein by reference. To maximize the formation of lower order adducts, isocytosine can be added slowly to the diisocyanate to ensure that an excess diisocyanate is present at the early stages of the reaction.

The second polymer present in the composition of this invention used to provide an imageable layer is a polyvinyl acetal in which at least 50% and up to 100% (number %) of the recurring units are acetal units. More typically, from about 80 to about 99% of the recurring units are acetal units. By "acetal", we mean 6-membered cyclic acetal groups that are incorporated into the polymeric chain, which acetal groups can be substituted with the same or different alkyl (that can be substituted with one or more hydroxyl, alkoxy, or acid groups), aryl (that can be substituted with one or more hydroxy, alkoxy, or acid groups), or acetylene groups. There may be multiple acetal units having different substituted or unsubstituted alkyl and aryl groups. The weight average molecular weight ($M_w$) of the useful second polymers is generally from about 2,000 to about 120,000, and more typically, it is from about 8,000 to about 50,000, as measured by Size Exclusion Chromatography. The optimal Mw may vary with the specific class of polymer and its use. Some useful polyvinyl acetals are described for example, in U.S. Pat. No. 6,255,033 (Levanon et al.) and U.S. Pat. No. 6,541,181 (Levanon et al.), and WO 2004/081662 (Memetea et al.), all incorporated herein by reference.

Useful polyvinyl acetals can be prepared from polyvinyl alcohols by appropriate acetalization using known methods. Considerable details for preparation of preferred polyvinyl acetals are provided in U.S. Pat. Nos. 6,255,033 and 6,541,181 (both noted above).

For example, representative polyvinyl acetals can be represented by the following Structure (II):

wherein:

A represents recurring units represented by the following Structure (IIa):

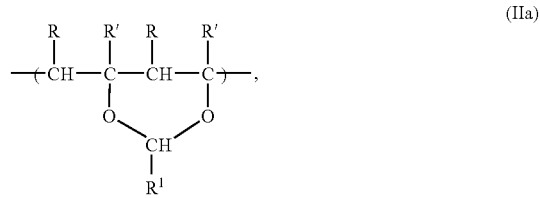

B represents recurring units represented by the following Structure (IIb):

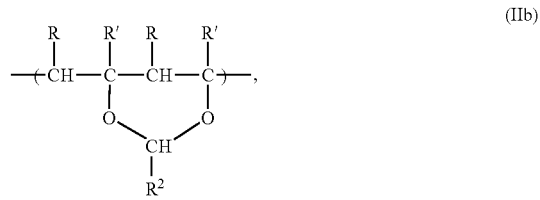

C represents recurring units represented by the following Structure (IIc):

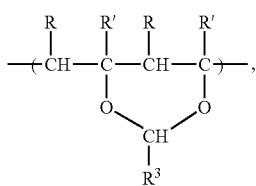

(IIc)

D represents recurring units represented by the following Structure (IId):

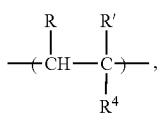

(IId)

E represents recurring units represented by the following Structure (IIe):

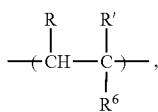

(IIe)

m is from about 5 to about 40 mol % (more typically from about 15 to about 35 mol %), n is from about 10 to about 60 mol % (more typically from about 20 to about 40 mol %), p can be from 0 to about 20 mol % (more typically from 0 to about 10 mol %), q is from about 1 to about 20 mol % (more typically from about 1 to about 15 mol %), and r is from about 5 to about 60 mol % (more typically from about 15 to about 55 mol %), provided that m+n+p≧50 mol %.

In Structures IIa-IIf, R and R' are independently hydrogen, a substituted or unsubstituted alkyl group having 1 to 4 carbon atoms (such as methyl, ethyl, chloromethyl, and t-butyl), or a halo group (such as fluoro, chloro, bromo, or iodo). More typically, R and R' are independently hydrogen, or a methyl or chloro group, more preferably, they are independently hydrogen or unsubstituted methyl, and most preferably, each is hydrogen.

Also, in Structure IIa, $R^1$ is a substituted or unsubstituted alkyl group having 1 to 12 carbon atoms (such as methyl, ethyl, n-propyl, iso-propyl, t-butyl, n-pentyl, n-dodecyl, methoxymethyl, and benzyl groups). Alternatively, $R^1$ is a substituted or unsubstituted phenol group optionally having a hydroxy substituent and up to 3 additional substituents including additional hydroxy substituents on the phenyl ring. Other substituents on the phenyl ring include but are not limited to, methoxy, halo, nitro, carboxy, ethenyl, carboxyalkyl, and phenyl groups. Typically, $R^1$ is a substituted or unsubstituted alkyl group having 1 to 6 carbon atoms, and more typically, $R^1$ is a substituted or unsubstituted methyl, ethyl, propyl (various isomers), and butyl (various isomers) group.

In Structure IIb, $R^2$ is a substituted or unsubstituted phenol (similarly defined as above for $R^1$) or a substituted or unsubstituted naphthol group having a hydroxy substituent and other optional substituents as described for $R^1$ (such as nitro, alkoxy, bromo, 1,2-propynyloxy, and allyloxy). However, $R^1$ and $R^2$ are different groups (that is, they are not the same phenol group).

In Structure IIc, $R^3$ is a substituted or unsubstituted alkyl group having 1 to 12 carbon atoms similarly to the definition for $R^1$ (such as carboxy substituted alkyl groups), substituted or unsubstituted alkynyl group having 2 to 4 carbon atoms (such as ethynyl groups), and substituted or unsubstituted phenyl groups (such as phenyl, 4-carboxyphenyl, carboxyalkyleneoxyphenyl, and carboxyalkylphenyl groups). For example, $R^3$ can be a carboxyalkyl group.

In Structure IId, $R^4$ is an $-O-C(=O)-R^5$ group wherein R is a substituted or unsubstituted alkyl group having 1 to 8 carbon atoms similarly to the definition of $R^1$ provided above. More typically, $R^5$ is a substituted or unsubstituted alkyl group having 1 to 4 carbon atoms and $R^5$ is a substituted or unsubstituted methyl group.

As indicated by the ratios of recurring units in Structure (I), the preferred poly(vinyl acetal)s are at least tetramers and can be pentamers, depending upon whether there are 4 or 5 of the defined classes of recurring units present. More typically, the polymers are pentamers.

The poly(vinyl acetal) is generally present in the composition and the imageable layer of the imageable element in an amount of from about 2 weight % to about 50 weight %, and preferably from about 8 to about 25 weight %, based on the total solids in the composition or layer.

Imageable Elements

The imageable elements are positive-working and the blend of first and second polymers described herein are present in the same imageable layer of these elements. In most embodiments, the imageable elements are single-layer imageable elements. In general for all embodiments, the imageable elements are formed by suitable application of an imaging formulation containing the first and second polymers to a suitable substrate to form an imageable layer. This substrate is usually treated or coated in various ways as described below prior to application of the formulation. The substrate can be treated to provide an "interlayer" for improved adhesion or hydrophilicity, and the imageable layer is applied over the interlayer.

The substrate generally has a hydrophilic surface, or at least a surface that is more hydrophilic than the applied imaging formulation on the imaging side. The substrate comprises a support that can be composed of any material that is conventionally used to prepare imageable elements such as lithographic printing plates. It is usually in the form of a sheet, film, or foil, and is strong, stable, and flexible and resistant to dimensional change under conditions of use so that color records will register a full-color image. Typically, the support can be any self-supporting material including polymeric films (such as polyester, polyethylene, polycarbonate, cellulose ester polymer, and polystyrene films), glass, ceramics, metal sheets or foils, or stiff papers (including resin-coated and metallized papers), or a lamination of any of these materials (such as a lamination of an aluminum foil onto a polyester film). Metal supports include sheets or foils of aluminum, copper, zinc, titanium, and alloys thereof.

Polymeric film supports may be modified on one or both surfaces with a "subbing" layer to enhance hydrophilicity, or paper supports may be similarly coated to enhance planarity. Examples of subbing layer materials include but are not limited to, alkoxysilanes, amino-propyltriethoxysilanes, glycidioxypropyl-triethoxysilanes, and epoxy functional polymers, as well as conventional hydrophilic subbing materials used in silver halide photographic films (such as gelatin and other naturally occurring and synthetic hydrophilic colloids and vinyl polymers including vinylidene chloride copolymers).

A typical substrate is composed of an aluminum support that may be coated or treated using techniques known in the art, including physical graining, electrochemical graining, chemical graining, and anodizing. The aluminum sheet can be subjected to electrochemical graining and then anodized.

An optional interlayer may be formed by treatment of the aluminum support with, for example, a silicate, dextrine, calcium zirconium fluoride, hexafluorosilicic acid, sodium phosphate/sodium fluoride, poly(vinyl phosphonic acid) (PVPA), vinyl phosphonic acid copolymer, poly(acrylic acid), or acrylic acid copolymer. The grained and/or anodized aluminum support can be treated with PVPA using known procedures to improve surface hydrophilicity.

The thickness of the substrate can be varied but should be sufficient to sustain the wear from printing and thin enough to wrap around a printing form. Typical embodiments include a treated aluminum foil having a thickness of from about 100 to about 600 μm.

The backside (non-imaging side) of the substrate may be coated with antistatic agents and/or slipping layers or a matte layer to improve handling and "feel" of the imageable element.

The substrate can also be a cylindrical surface having the composition with first and second polymers applied thereon, and thus be an integral part of the printing press. The use of such imaged cylinders is described for example in U.S. Pat. No. 5,713,287 (Gelbart).

The imageable element also includes one or more radiation absorbing compounds. Typically, they are present only in the imageable layer containing first and second polymers. While these compounds can be sensitive to any suitable energy form (for example, UV radiation), they are typically sensitive to infrared radiation and thus, the radiation absorbing compounds are known as infrared radiation absorbing compounds ("IR absorbing compounds") that absorbs radiation from about 600 to about 1200 nm and preferably from about 700 to about 1200 nm. A single imageable layer is generally the outermost layer in the imageable element.

IR dyes (especially those that are soluble in the alkaline developer) are desired to reduce the formation of sludge in the developer solution. Useful IR dyes include but are not limited to, azo dyes, squarylium dyes, croconate dyes, triarylamine dyes, thioazolium dyes, indolium dyes, oxonol dyes, oxazolium dyes, cyanine dyes, merocyanine dyes, phthalocyanine dyes, indocyanine dyes, indotricarbocyanine dyes, hemicyanine dyes, streptocyanine dyes, oxatricarbo-cyanine dyes, thiocyanine dyes, thiatricarbocyanine dyes, merocyanine dyes, cryptocyanine dyes, naphthalocyanine dyes, polyaniline dyes, polypyrrole dyes, polythiophene dyes, chalcogenopyryloarylidene and bi(chalcogenopyrylo)-polymethine dyes, oxyindolizine dyes, pyrylium dyes, pyrazoline azo dyes, oxazine dyes, naphthoquinone dyes, anthraquinone dyes, quinoneimine dyes, methine dyes, arylmethine dyes, polymethine dyes, squarine dyes, oxazole dyes, croconine dyes, porphyrin dyes, and any substituted or ionic form of the preceding dye classes. Suitable dyes are described for example, in U.S. Pat. No. 4,973,572 (DeBoer), U.S. Pat. No. 5,208,135 (Patel et al.), U.S. Pat. No. 5,244,771 (Jandrue Sr. et al.), and U.S. Pat. No. 5,401,618 (Chapman et al.), and EP 0 823 327A1 (Nagasaka et al.).

Cyanine dyes having an anionic chromophore are also useful. For example, the cyanine dye may have a chromophore having two heterocyclic groups. In another embodiment, the cyanine dye may have at least two sulfonic acid groups, more particularly two sulfonic acid groups and two indolenine groups. Useful IR-sensitive cyanine dyes of this type are described for example in U.S. Patent Application Publication 2005-0130059 (Tao).

A general description of one class of suitable cyanine dyes is shown by the formula in paragraph 0026 of WO 2004/101280 (Munnelly et al.).

In addition to low molecular weight IR-absorbing dyes, IR dye moieties bonded to polymers can be used as well. Moreover, IR dye cations can be used as well, that is, the cation is the IR absorbing portion of the dye salt that ionically interacts with a polymer comprising carboxy, sulfo, phospho, or phosphono groups in the side chains.

Near infrared absorbing cyanine dyes are also useful and are described for example in U.S. Pat. No. 6,309,792 (Hauck et al.), U.S. Pat. No. 6,264,920 (Achilefu et al.), U.S. Pat. No. 6,153,356 (Urano et al.), U.S. Pat. No. 5,496,903 (Watanate et al.). Suitable dyes may be formed using conventional methods and starting materials or obtained from various commercial sources including American Dye Source (Baie D'Urfe, Quebec, Canada) and FEW Chemicals (Germany). Other useful dyes for near infrared diode laser beams are described, for example, in U.S. Pat. No. 4,973,572 (DeBoer).

Examples of useful IR radiation absorbing compounds include ADS-830A and ADS-1064 (American Dye Source, Baie D'Urfe, Quebec, Canada), EC2117 (FEW, Wolfen, Germany), Cyasorb® IR 99 and Cyasorb® IR 165 GPT Glendale Inc., Lakeland, Fla.), and IR Dyes A and B described in the Examples below.

Specific useful IR dyes include but are not limited to the following compounds:

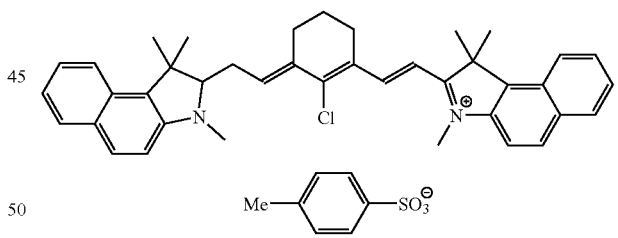

Same as above but with $C_3F_7CO_2^-$ as the anion.

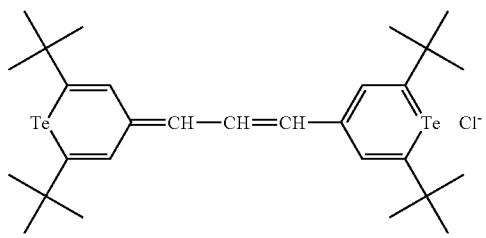

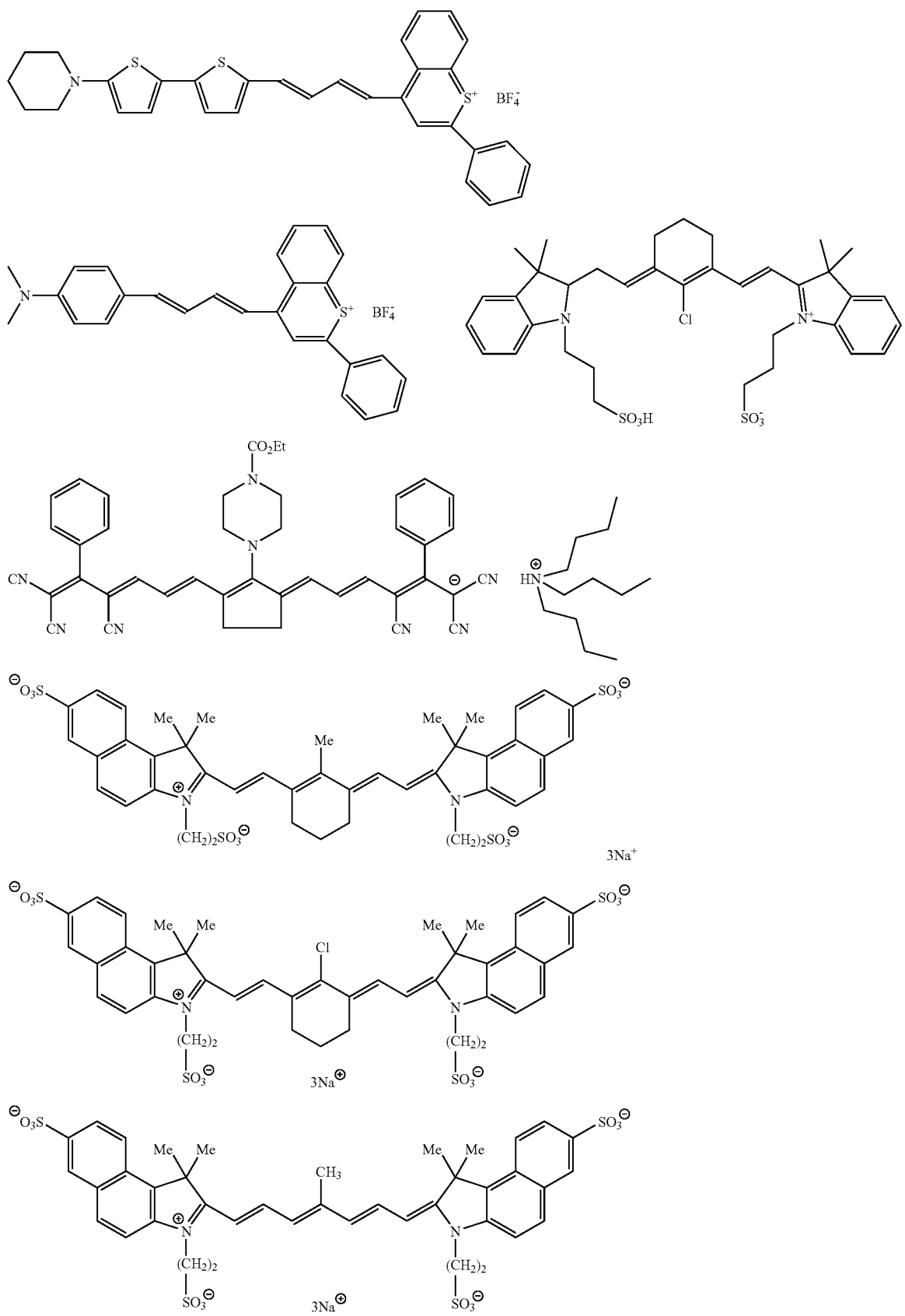

-continued

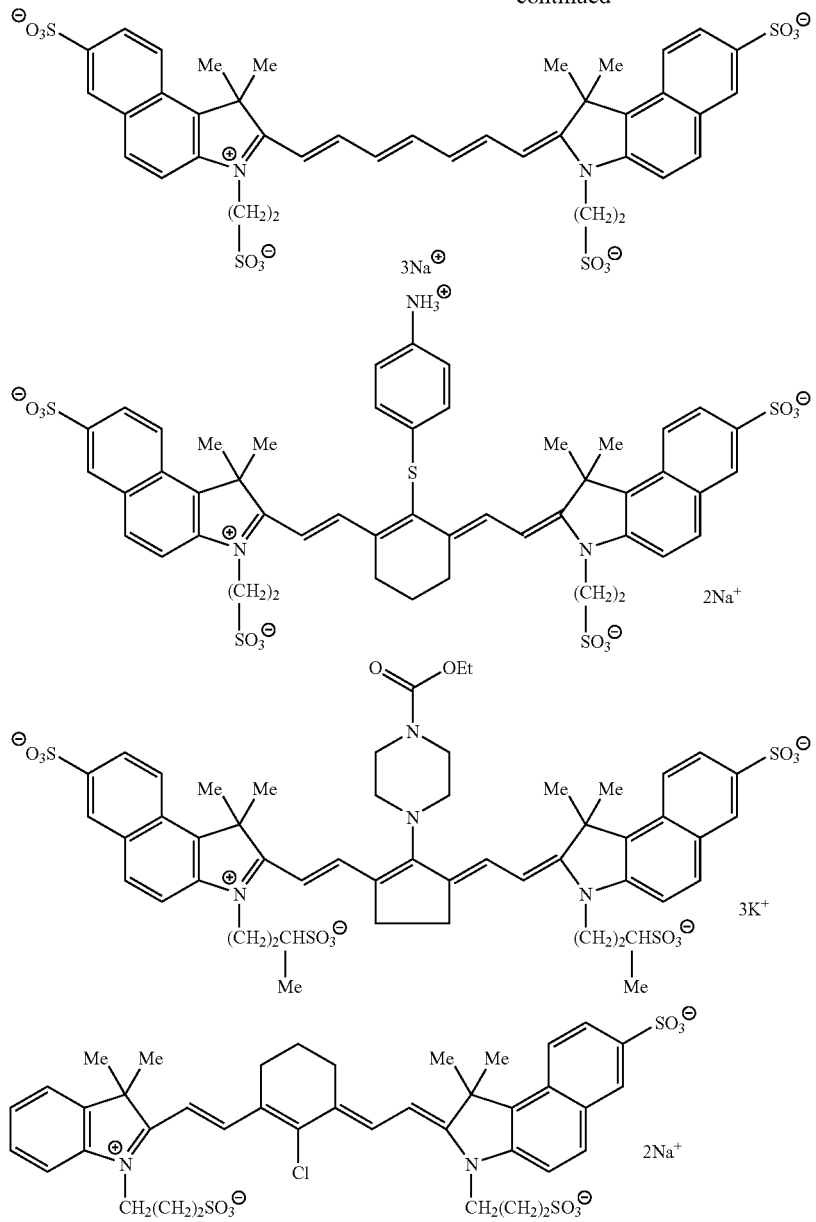

Useful IR absorbing compounds include various pigments including carbon blacks such as carbon blacks that are surface-functionalized with solubilizing groups are well known in the art. Carbon blacks that are grafted to hydrophilic, nonionic polymers, such as FX-GE-003 (manufactured by Nippon Shokubai), or which are surface-functionalized with anionic groups, such as CAB-O-JET® 200 or CAB-O-JET® 300 (manufactured by the Cabot Corporation) are also useful. Other useful pigments include, but are not limited to, Heliogen Green, Nigrosine Base, iron (III) oxides, manganese oxide, Prussian Blue, and Paris Blue.

The radiation absorbing compound can be present in the imageable element in an amount of at least 0.5 and up to 10 weight % and typically at from about 0.5 to about 5 weight % (based on total dry weight of the layer in which it is located). Alternatively, the amount can be defined by an absorbance in the range of from about 0.05 to about 3, and typically from about 0.1 to about 1.5, in the element as measured by reflectance UV-visible spectrophotometry. The particular amount needed for this purpose would be readily apparent to one skilled in the art, depending upon the specific compound used.

The radiation absorbing compounds may be included in a separate layer that is in thermal contact with the single imageable layer. Thus, during imaging, the action of the radiation absorbing compound can be transferred to the imageable layer without the compound originally being incorporated into it.

The imageable layer containing the first and second polymers can also include one or more additional compounds that act as dissolution inhibitors that function as solubility-suppressing components for these polymers. Dissolution inhibitors typically have polar functional groups that are believed to act as acceptor sites for hydrogen bonding with various groups in the polymers. The acceptor sites comprise atoms with high electron density, preferably selected from electronegative first row elements such as carbon, nitrogen, and oxygen. Dissolution inhibitors that are soluble in the alkaline developer are preferred. Useful polar groups for dissolution inhibitors include but are not limited to, ether groups, amine groups, azo groups, nitro groups, ferrocenium groups, sulfoxide groups, sulfone groups, diazo groups, diazonium groups, keto groups, sulfonic acid ester groups, phosphate ester groups, triarylmethane groups, onium groups (such as sulfonium, iodonium, and phosphonium groups), groups in which a nitrogen atom is incorporated into a heterocyclic ring, and groups that contain a positively charged atom (such as quaternized ammonium group). Compounds that contain a positively-charged nitrogen atom useful as dissolution inhibitors include, for example, tetralkyl ammonium compounds and quaternized heterocyclic compounds such as quinolinium compounds, benzothiazolium compounds, pyridinium compounds, and imidazolium compounds. Further details and representative compounds useful as dissolution inhibitors are described for example in U.S. Pat. No. 6,294,311 (noted above). Useful dissolution inhibitors include triarylmethane dyes such as ethyl violet, crystal violet, malachite green, brilliant green, Victoria blue B, Victoria blue R, and Victoria pure blue BO, BASONYL® Violet 610 and D11 (PCAS, Longjumeau, France). These compounds can also act as contrast dyes that distinguish the non-exposed regions from the exposed regions in the developed imageable element.

When a dissolution inhibitor is present, its amount can vary widely, but generally it is present in an amount of at least 0.5 weight % and up to 30 weight % (based on the total dry layer weight).

The imageable layer can further include a variety of additives including dispersing agents, humectants, biocides, plasticizers, surfactants for coatability or other properties, viscosity builders, dyes or colorants to allow visualization of the written image, pH adjusters, drying agents, defoamers, preservatives, antioxidants, development aids, rheology modifiers or combinations thereof, or any other addenda commonly used in the lithographic art, in conventional amounts.

The positive-working imageable element can be prepared by applying the imageable layer formulation(s) over the surface of the substrate (and any other hydrophilic layers provided thereon) using conventional coating or lamination methods. Thus, the formulations can be applied by dispersing or dissolving the desired ingredients in a suitable coating solvent, and the resulting formulations are sequentially or simultaneously applied to the substrate using suitable equipment and procedures, such as spin coating, knife coating, gravure coating, die coating, slot coating, bar coating, wire rod coating, roller coating, or extrusion hopper coating. The formulations can also be applied by spraying onto a suitable support (such as an on-press printing cylinder).

The coating weight for said single imageable layer is from about 0.5 to about 2.5 g/m$^2$ and more typically from about 1 to about 2 g/m$^2$.

The selection of solvents used to coat the layer formulation(s) depends upon the nature of the polymeric materials and other components in the formulations. Generally, the imageable layer formulation is coated out of acetone or another ketone such as methyl ethyl ketone (MEK), tetrahydrofuran, 1-methoxypropan-2-ol, 1-methoxy-2-propyl acetate, and mixtures thereof using conditions and techniques well known in the art. One particularly useful solvent mixture includes MEK, γ-butyrolactone (BLO), 1-methoxypropan-2-ol (or Dowanol PM or PGME), and water. Another solvent mixture includes MEK and PGME.

Alternatively, the layer(s) may be applied by conventional extrusion coating methods from melt mixtures of the respective layer compositions. Typically, such melt mixtures contain no volatile organic solvents.

Intermediate drying steps may be used between applications of the various layer formulations to remove solvent(s) before coating other formulations. Drying steps may also help in preventing the mixing of the various layers.

After drying the layer(s), the element can be further "conditioned" with a heat treatment at from about 40 to about 90° C. for at least 4 hours (for example, at least 20 hours) under conditions that inhibit the removal of moisture from the layer(s). More preferably, the heat treatment is carried out from about 50 to about 70° C. for at least 24 hours. During the heat treatment, the imageable element(s) is wrapped or encased in a water-impermeable sheet material to represent an effective barrier to moisture removal from the element, or the heat treatment is carried out in an environment in which relative humidity is controlled to at least 25%. In addition, the water-impermeable sheet material can be sealed around the edges of the element (or plurality of elements), with the water-impermeable sheet material being a polymeric film or metal foil that is sealed around the edges of the element(s).

This conditioning heat treatment can be carried out with a stack of elements, for example at least 100 elements and generally more, or when the imageable element is in the form of a coil.

Representative methods for preparing positive-working imageable elements of this invention are described below in the Examples.

The imageable elements can have any useful form including, but not limited to, printing plate precursors, printing cylinders, printing sleeves and printing tapes (including flexible printing webs). Preferably, the imageable elements are printing plate precursors for providing lithographic printing plates.

Printing plate precursors can be of any useful size and shape (for example, square or rectangular) having the requisite imageable layer(s) disposed on a suitable substrate. Printing cylinders and sleeves are known as rotary printing members having the substrate and an imageable layer (and any other layers) in a cylindrical form. Hollow or solid metal cores can be used as substrates for printing sleeves.

Imaging and Development

During use, the imageable elements are exposed to a suitable source of radiation such as near-infrared or infrared radiation, depending upon the radiation absorbing compound present in the radiation-sensitive composition, at a wavelength of from about 150 to about 1500 nm. Typically, imaging is carried out using an infrared laser at a wavelength of from about 700 to about 1200 nm. The laser used to expose the imageable element is preferably a diode laser, because of the reliability and low maintenance of diode laser systems, but other lasers such as gas or solid-state lasers may also be used. The combination of power, intensity and exposure time for laser imaging would be readily apparent to one skilled in the art. Presently, high performance lasers or laser diodes used in commercially available imagesetters emit infrared radiation at a wavelength of from about 800 to about 850 nm or from about 1060 to about 1120 nm.

The imaging apparatus can function solely as a platesetter or it can be incorporated directly into a lithographic printing press. In the latter case, printing may commence immediately after imaging, thereby reducing press set-up time considerably. The imaging apparatus can be configured as a flatbed recorder or as a drum recorder, with the imageable element mounted to the interior or exterior cylindrical surface of the drum. Examples of useful imaging apparatus are available as models of Creo Trendsetter® imagesetters available from Eastman Kodak Company (Burnaby, British Columbia, Canada) that contain laser diodes that emit near infrared radiation at a wavelength of about 830 nm. Other suitable imaging sources include the Crescent 42T Platesetter that operates at a wavelength of 1064 nm and the Screen PlateRite 4300 series or 8600 series platesetter (available from Screen, Chicago, Ill.). Additional useful sources of radiation include direct imaging presses that can be used to image an imageable element while it is attached to the printing plate cylinder. An example of a suitable direct imaging printing press includes the Heidelberg SM74-DI press (available from Heidelberg, Dayton, Ohio).

Imaging speeds may be in the range of from about 50 to about 1500 mJ/cm$^2$, and more particularly from about 75 to about 400 mJ/cm$^2$.

While laser imaging is preferred in the practice of this invention, imaging can be provided by any other means that provides thermal energy in an imagewise fashion. For example, imaging can be accomplished using a thermoresistive head (thermal printing head) in what is known as "thermal printing", described for example in U.S. Pat. No. 5,488,025 (Martin et al.) and as used in thermal fax machines and sublimation printers. Thermal print heads are commercially available for example, as Fujitsu Thermal Head FTP-040 MCS001 and TDK Thermal Head F415 HH7-1089.

Imaging is generally carried out by direct digital imaging. The image signals are stored as a bitmap data file on a computer. Such files may be generated by a raster image processor (RIP) or other suitable means. The bitmaps are constructed to define the hue of the color as well as screen frequencies and angles.

Imaging of the imageable element produces an imaged element that comprises a latent image of imaged (exposed) and non-imaged (non-exposed) regions. Developing the imaged element with a suitable alkaline developer removes the exposed regions of the outermost layer and any other layers underneath it, and exposing the hydrophilic surface of the substrate. Thus, such imageable elements are "positive-working". The exposed (or imaged) regions of the hydrophilic surface repel ink while the unexposed (or non-imaged) regions of the outer layer accept ink.

More particularly, development is carried out for a time sufficient to remove the imaged (exposed) regions of the imageable layer and any underlying layers, but not long enough to remove the non-imaged (non-exposed) regions. Thus, the imaged (exposed) regions of the imageable layer are described as being "soluble" or "removable" in the alkaline developer because they are removed, dissolved, or dispersed within the alkaline developer more readily than the non-imaged (non-exposed) regions. Thus, the term "soluble" also means "dispersible".

The imaged elements are generally developed using conventional processing conditions. Both aqueous alkaline developers and organic solvent-containing alkaline developers can be used, with the aqueous alkaline developers being preferred.

Aqueous alkaline developers generally have a pH of at least 7 and more typically of at least 11. The higher pH developers are generally best for processing the single-layer elements. Useful alkaline aqueous developers include 3000 Developer, 9000 Developer, GoldStar® Developer, Goldstar® Plus Developer, GoldStar® Premium, GREENSTAR Developer, ThermalPro Developer, PROTHERM Developer, MX1813 Developer, and MX1710 Developer (all available from Eastman Kodak Company). These compositions also generally include surfactants, chelating agents (such as salts of ethylenediaminetetraacetic acid), and alkaline components (such as inorganic metasilicates, organic metasilicates, hydroxides, and bicarbonates).

Organic solvent-containing alkaline developers may also be useful. These developers are generally single-phase solutions of one or more organic solvents that are miscible with water, such as 2-ethylethanol and 2-butoxyethanol. Representative solvent-containing alkaline developers include ND-1 Developer, 955 Developer and 956 Developer (available from Eastman Kodak Company).

Generally, the alkaline developer is applied to the imaged element by rubbing or wiping the outer layer with an applicator containing the developer. Alternatively, the imaged element can be brushed with the developer or the developer may be applied by spraying the outer layer with sufficient force to remove the exposed regions. Typically, the imaged element is immersed in the developer. In all instances, a developed image is produced in a lithographic printing plate having excellent resistance to press room chemicals.

Following development, the imaged element can be rinsed with water and dried in a suitable fashion. The dried element can also be treated with a conventional gumming solution (preferably gum arabic).

The imaged and developed element can also be baked in a postbake operation that can be carried out to increase run length of the resulting imaged element. Baking can be carried out, for example at from about 220° C. to about 240° C. for from about 7 to about 10 minutes, or at about 120° C. for 30 minutes.

Printing can be carried out by applying a lithographic ink and fountain solution to the printing surface of the imaged element. Ink is taken up by the non-imaged regions of the outermost layer and fountain solution is taken up by the hydrophilic surface of the substrate revealed by the imaging and development process. The ink is then transferred to a suitable receiving material (such as cloth, paper, metal, glass, or plastic) to provide a desired impression of the image thereon. If desired, an intermediate "blanket" roller can be used to transfer the ink from the imaged element to the receiving material. The imaged elements can be cleaned between impressions, if desired, using conventional cleaning means and chemicals.

The following examples are provided to illustrate the practice of the invention but are by no means intended to limit the invention in any manner.

EXAMPLES

The components and materials used in the examples and analytical methods were as follows, and any components without a noted source can be obtained from a commercial chemical supply company such as Aldrich Chemical Co. (Milwaukee, Wis.):

The polyvinyl acetal "B18-2" had the following structure and was prepared by procedures described in U.S. Pat. No. 6,255,033 (noted above):

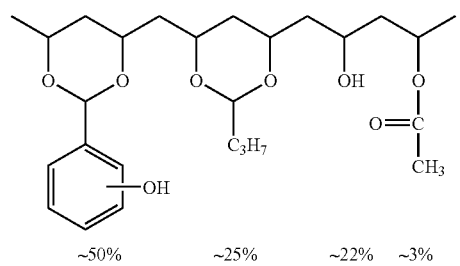

Butvar® B-76 polyvinyl acetal resin was obtained from Solutia Inc. (Martinsville, Va.).

Bakelite 9900 is a resole resin that was obtained from Hexion Specialty Chemicals (Columbus, Ohio).

BLO is γ-butyrolactone.

Byk® 307 is a polyethoxylated dimethylpolysiloxane copolymer in a 25 wt. % xylene/methoxypropyl acetate solution (Byk Chemie, Wallingford, Conn.).

CAHPh is cellulose acetate hydrogen phthalate (Aldrich Chemical Company)

Crystal Violet is C.I. 42555, Basic Violet 3 with $\lambda_{max}$=588 nm.

DHBP is 2,4-dihydroxy benzophenone (Aldrich Chemical Company, Milwaukee, Wis.).

Durez 33816 is a novolac resin, 70% m-cresol/30% p-cresol, Mw 45,000 (Durez-Sumitomo, Grand Island, N.Y.).

GoldStar® Plus and GoldStar® Premium Developers are available from Eastman Kodak Company (Rochester, N.Y.).

IR Dye A is 2-[2-[2-chloro-3-[(1,3-dihydro-1,3,3-trimethyl-2H-indol-2-ylidene)ethylidene]-1-cyclohexen-1-yl] ethenyl]-1,3,3-trimethyl-3H-indolium bromide (Honeywell Specialty Chemicals, Morristown, N.J.).

IR Dye B was obtained from Eastman Kodak Company and is represented by the following formula:

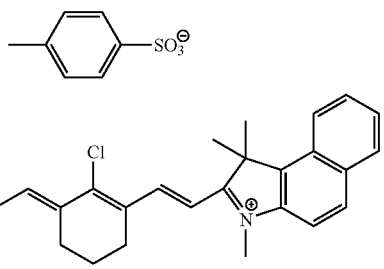

IR Dye B

L6 Developer comprises $K_2O:SiO_2$ (1:1.2 molar ratio) at 8.2% (obtained by blending commercially available potassium metasilicate, for example, Kasolv 16 from PQ Corporation, Philadelphia, Pa. with potassium hydroxide), sodium salicylate at 1%, d-sorbitol at 1%, Triton® H-55 surfactant at 0.5%, Tergitol™ NP-12 surfactant at 0.04%, and water at 89.26% (by weight).

LB 6564 is a phenol/cresol novolac resin (Rutgers-Plenco LLC, Sheboygan, Wis.).

MEK is methyl ethyl ketone.

QHB-ZH8011 is a polymer designed for the practice of this invention by modifying an m/p-cresol novolak (ratio of 6:4), Mw of about 5600 that was obtained from Dai Nippon Chemicals, Ltd. (Gunma, Japan) with 4.2 mol % QHB per phenolic group.

QHB-IH1225 is a polymer designed for the practice of this invention by modifying a phenolic compound, Mw of about 5500 that was obtained from Dai Nippon Chemicals, Ltd., with 4.2 mol % QHB per phenolic group.

Silikophen P50X is a phenylmethyl polysiloxane (from Tego Chemie Service, Essen, Germany).

Substrate A represents a 0.3 mm gauge aluminum electrograined and anodized sheet that had then been treated with poly(vinyl phosphonic acid).

THPE represents 1,1,1-tris(p-hydroxyphenyl)ethane that was obtained from DuPont (Wilmington, Del.).

Triton® H-55 and Tergitol™ NP-12 surfactants were obtained from Dow Chemical Company (Midland, Mich.).

Examples 1-3

Imageable Elements

The imaging layer coating formulations are described in the following TABLE I (in grams) and were prepared as solutions in a solvent mixture of MEK and PGME (20%: 80%) for the Example 1 element and the Comparative A-C elements. The concentrations of components were selected to provide a dry coating weight of 1.5 g/m onto Substrate A using a Meyer coating bar. The single imageable layer formulations were dried at a temperature of 123° C. for 50 seconds to remove coating solvent(s). The resulting elements were then heat treated at a temperature of 55° C. and a relative humidity of 80% RH for 3 days.

TABLE I

| Component | Example 1 | Example 2 | Comparative A | Comparative B | Comparative C |
|---|---|---|---|---|---|
| QHB-ZH8011 | 40.45 | 40.45 | 44.8 | 0 | 0 |
| QHB-IH1225 | 33.24 | 33.24 | 35.7 | 0 | 0 |
| Durez 33816 | 0 | 0 | 10 | 0 | 34.8 |
| B18-2 | 16.72 | 0 | 0 | 56.65 | 0 |
| Butvar ® B-76 | 0 | 16.72 | 0 | 0 | 0 |
| Bakelite 9900 | 0 | 0 | 0 | 28.6 | 0 |
| LB6564 | 0 | 0 | 0 | 0 | 55.8 |
| CAHPh | 1.0 | 1.0 | 1.0 | 0 | 1.0 |
| DHBP | 4.18 | 4.18 | 4.18 | 0 | 0 |
| THPE | 0 | 0 | 0 | 8.9 | 0 |
| Crystal violet | 1.89 | 1.89 | 1.89 | 1.89 | 1.89 |
| IR Dye A | 0.65 | 0.65 | 0.65 | 0.90 | 0.65 |
| IR Dye B | 1.34 | 1.34 | 1.34 | 1.62 | 1.34 |
| Silikophen P50X | 0 | 0 | 0 | 0 | 6.0 |
| Byk ® 307 | 0.5 | 0.5 | 0.5 | 0.65 | 0.5 |

The imageable elements were evaluated using the following test methods:

To evaluate imaging speed, the elements were imaged using a Creo Trendsetter® 3244 platesetter (Eastman Kodak Company, Burnaby, British Columbia, Canada). Following exposure, the imaged elements were developed using a commercially available Mercury of the Americas processor (Eastman Kodak Company), containing GoldStar® Premium developer at 23° C. at a processing speed of 1000 mm/min. The imaging speed of the elements was defined as the level of exposure (as measured in $mJ/cm^2$) that was required to clean out a region of 50% (2×2 pixel) checkerboard pattern. Clean out was assessed using a D196 densitometer (Gretag Mac-Beth, Regensdorf, Switzerland).

"Solvent Resistance" was measured by measuring the ΔOD of a solid area before and after exposure to a concentrated fountain solution comprising:

1. 6 wt. % Astro Mark 3 fountain solution (Nikken Chemical Ltd, Tokyo, Japan), which fountain solution comprises 5-30 wt. % of butoxyethanol, 5-15 wt. % of polyethylene glycol, and 1-3 wt. % of ammonium nitrate, with the remainder being water.
2. 10 wt. % iso-propyl alcohol (Sigma-Aldrich, St Louis, Mo.), and
3. 84 wt. % reverse osmosis purified water.

The ΔOD was measured between a solid area after development and a solid area that had been developed and then exposed to the fountain solution for 8 hours at ambient temperature. A ΔOD of −0.35 is acceptable and a ΔOD of −0.20 is preferred.

"Clean-out" was measured by imaging the imageable elements at 120 mJ/cm² on a Treadsetter® 3244 platesetter, and measuring the time (seconds) needed to completely "clear" the imaged region while the imaged element was soaked in the noted developer at 25° C.

"Density Loss" was measured by comparing the optical density (cyan filter) for a solid non-exposed region of an element ($OD_{undev}$) to a non-exposed region of an element ($OD_{dev}$) that had been treated to the noted developer at 25° C. for 30 seconds. The % weight loss (which is indicative of density loss) was calculated using the following formula:

$$\text{Weight Loss} = \left\{1 - \left[\frac{(OD_{dev} - OD \text{ of substrate})}{(OD_{undev} - OD \text{ of substrate})}\right]\right\} \times 100\%$$

"Solubility Differential" refers to the ratio of the time taken to fully dissolve a non-exposed element to the time to fully dissolve an exposed region, using Goldstar® Premium developer at 25° C., and the element samples were submerged in the developer with no mechanical agitation to assist development. The level of exposure used is that needed to give a satisfactory 50% dot as measured previously.

The results of these tests are shown in the following TABLES II and III.

TABLE II

| Imageable Layer | Polymers | Imaging Speed (mJ/cm²) | Solvent Resistance (8 hours) | Solubility Differential |
|---|---|---|---|---|
| Example 1 | QHBE-Novolak and B18-2 | 120 | −0.15 | 30 |
| Example 2# | QHBE-novolak + Butvar ® B-76 | 150 | −0.16 | >20* |
| Comparative A | QHBE-Novolak | 150 | −0.33 | 35 |
| Comparative B | B18-2 | 90 | −0.08 | 15 |
| Comparative C | Novolak | 110 | −0.95 | 40 |

Example 2 element was processed in GoldStar ® Plus Developer
*The non-imaged regions did not process cleanly so a measurement was difficult to quantify.

TABLE III

| | Developer | | | | | |
|---|---|---|---|---|---|---|
| | Goldstar ® Premium | | Goldstar ® Plus | | L6 | |
| Imageable Layer | Clean-out (seconds) | Density Loss | Clean-out (seconds) | Density Loss | Clean-out (seconds) | Density Loss |
| Example 1 | 4 | 4% | 1.5 | 20% | 3 | 34% |
| Comparative A | 3 | 6% | 2 | 16% | 2 | 45% |
| Comparative B | 3 | 20% | 1 | 100% | 6 | 75% |
| Comparative C | 2 | 3.5% | 2 | 6% | 2 | 31% |

Several conclusions can be drawn from these results. Comparing the results for Comparative A (containing the QHBE-Novolak resin) to Comparative C (containing an unmodified novolak resin) indicates that the use of QHBE modification for novolak resins enhances solvent resistance. The solvent resistance was further enhanced by adding a supplementary polyvinyl acetal resin (Examples 1 and 2 vs. Comparative A). This improvement is provided with very little change in processing latitude as indicated by the more rapid "clean-out" and lower optical density loss.

The use of a polyvinyl acetal resin alone (Comparative B) provides solvent resistance but also exhibited poor processing latitude, as measured by the higher optical density loss and narrower range of developer choice.

However, the element of this invention (Examples 1 and 2) having a blend of first and second polymers in the imageable layer, provided improved processing latitude and desired imaging speed. Examples 1 and 2 were acceptably developed using several commercial developers.

The invention has been described in detail with particular reference to certain preferred embodiments thereof, but it will be understood that variations and modifications can be effected within the spirit and scope of the invention.

The invention claimed is:

1. A positive-working imageable element comprising a substrate having thereon a single, outermost thermally imageable layer, said element further comprising an infrared radiation absorbing compound that absorbs at a wavelength of from about 700 to about 1200 nm,
   wherein said single outermost thermally imageable layer comprises first and second polymers,
   said first polymer is an alkaline soluble polymer that comprises: (1) at least one covalently bonded unit that is derived from a polyfunctional material that is soluble or dispersible in an aqueous developer, and (2) at least one thermally reversible non-covalently bonded unit that includes a two or more centered H-bonds within that unit, and
   said second polymer is a polyvinyl acetal in which at least 50% of the recurring units are acetal units,
   wherein the weight ratio of said first polymer to said second polymer is from about 1:1 to about 15:1.

2. The element of claim 1 wherein said first and second polymers are present in a total dry coverage of from about 50 to 99 weight % based on total dry weight of said imageable layer.

3. The element of claim 1 wherein said two or more centered H-bonds includes a four centered H-bond.

4. The element of claim 1 wherein said covalently bonded unit that is derived from a polyfunctional phenolic resin, an acrylic resin, a polyester resin, a polyurethane resin, or a combination thereof.

5. The element of claim 1 wherein said two or more centered H-bond is a four centered H-bond comprising two isocytosine groups.

6. The element of claim 1 wherein said first polymer comprises recurring units having pendant groups represented by the following Structure (I)

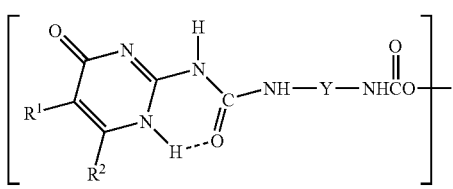
(I)

wherein $R^1$ and $R^2$ are independently hydrogen or a hydrocarbyl group, and Y is a hydrocarbylene derived from a diisocyanate represented by the formula $Y(NCO)_2$.

7. The element of claim 6 wherein said first polymer is derived from a polyfunctional phenolic resin that is a phenol/cresol novolak, polyvinyl phenolic polymer, vinyl phenol/hydrocarbyl acrylate copolymer, or a combination thereof, and said diisocyanate is isophorone diisocyanate, methylene-bis-phenyl diisocyanate, toluene diisocyanate, hexamethylene diisocyanate, tetramethylxylylene diisocyanate, dimers thereof, adducts with diols, or a combination thereof.

8. The element of claim 6 wherein said first polymer comprises recurring units of which from about 1 to about 20 mol % comprise said pendant groups represented by Structure (I).

9. The element of claim 6 wherein said first polymer comprises recurring units of which from about 1 to about 10 mol % comprise said pendant groups represented by Structure (I).

10. The element of claim 1 wherein said second polymer is represented by the following Structure (II):

wherein:

A represents recurring units represented by the following Structure (IIa):

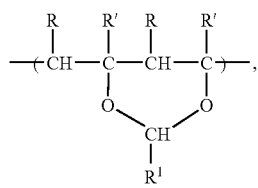

B represents recurring units represented by the following Structure (IIb):

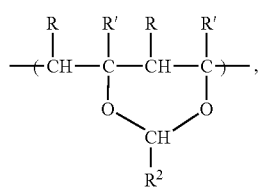

C represents recurring units represented by the following Structure (IIc):

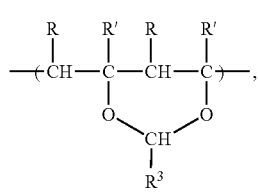

D represents recurring units represented by the following Structure (IId):

E represents recurring units represented by the following Structure (IIe):

wherein R and R' are independently hydrogen or an alkyl group having 1 to 4 carbon atoms, or a halo group, $R^1$ is an alkyl group having 1 to 12 carbon atoms or a phenol group, $R^2$ is a phenol or naphthol group, $R^3$ is an alkyl group having 1 to 12 carbon atoms, an alkynyl group having 2 to 4 carbon atoms, or a phenyl group, $R^4$ is an —O—C(=O)—$R^5$ group wherein $R^5$ an alkyl group having 1 to 8 carbon atoms, m is from about 5 to about 40 mol %, n is from about 10 to about 60 mol %, p can be from 0 to about 20 mol %, q is from about 1 to about 20 mol %, and r is from about 5 to about 60 mol %, provided that m+n+p≧50 mol %.

11. The element of claim 1 wherein said second polymer is present in an amount of from about 2 to about 50 weight % based on total dry weight of said imageable layer.

12. The element of claim 1 wherein said radiation absorbing compound is an infrared radiation absorbing dye that is present in said imageable layer in an amount of from about 0.5 to about 10 weight %, based on the total dry weight of said imageable layer.

13. A method for forming an image comprising:
A) thermally imaging the imageable element of claim 1 using radiation having a maximum absorbance of from about 700 to about 1200 nm, thereby forming an imaged element with exposed and non-exposed regions, and
B) contacting said imaged element with an alkaline developer to remove only said exposed regions.

14. The method of claim 13 wherein said first and second polymers are present in a total dry coverage of from about 50 to 99 weight % based on total dry weight of said imageable layer, said first polymer comprising recurring units having pendant groups represented by the Structure (I):

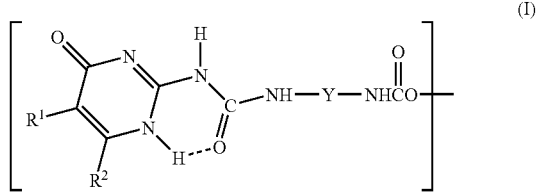

wherein $R^1$ and $R^2$ are independently hydrogen or a hydrocarbyl group, and Y is a hydrocarbylene derived from a diisocyanate represented by the formula $Y(NCO)_2$, said first polymer being derived from a polyfunctional phenolic resin that is a phenol/cresol novolak, polyvinyl phenolic polymer, vinyl phenol/hydrocarbyl acrylate copolymer, or a combination thereof, and said diisocyanate is isophorone diisocyanate, methylenebis-phenyl diisocyanate, toluene diisocyanate, hexamethylene diisocyanate, tetramethylxylylene diisocyanate, dimers thereof, adducts with diols, or a combination thereof, and said second polymer is represented by the following Structure (II):

$$-(A)_m-(B)_n-(C)_p-(D)_q-(E)_r- \quad (II)$$

wherein:

A represents recurring units represented by the following Structure (IIa):

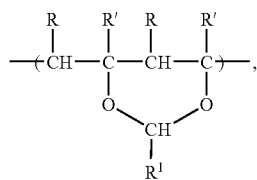

(IIa)

B represents recurring units represented by the following Structure (IIb):

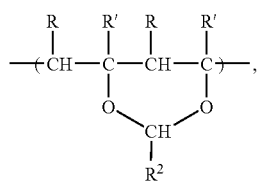

(IIb)

C represents recurring units represented by the following Structure (IIc):

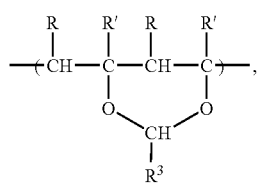

(IIc)

D represents recurring units represented by the following Structure (IId):

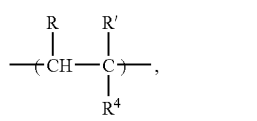

(IId)

E represents recurring units represented by the following Structure (IIe):

(IIe)

wherein R and R' are independently hydrogen or an alkyl group having 1 to 4 carbon atoms, or a halo group, $R^1$ is an alkyl group having 1 to 12 carbon atoms or a phenol group, $R^2$ is a phenol or naphthol group, $R^3$ is an alkyl group having 1 to 12 carbon atoms, an alkynyl group having 2 to 4 carbon atoms, or a phenyl group, $R^4$ is an —O—C(=O)—$R^5$ group wherein $R^5$ an alkyl group having 1 to 8 carbon atoms, m is from about 5 to about 40 mol %, n is from about 10 to about 60 mol %, p can be from 0 to about 20 mol %, q is from about 1 to about 20 mol %, and r is from about 5 to about 60 mol %, provided that m+n+p≧50 mol %.

15. A method for forming an image comprising:

A) thermally imaging a positive-working imageable element using radiation having a maximum absorbance of from about 700 to about 1200 nm, thereby forming an imaged element with exposed and non-exposed regions, and B) contacting said imaged element with an alkaline developer to remove only said exposed regions, said imageable element comprising a substrate having thereon a single, outermost thermally imageable layer, said element further comprising an infrared radiation absorbing compound that absorbs at a wavelength of from about 700 to about 1200 nm, wherein said single outermost thermally imageable layer comprises first and second polymers, said first polymer is an alkaline soluble polymer that comprises: (1) at least one covalently bonded unit that is derived from a polyfunctional material that is soluble or dispersible in an aqueous developer, and (2) at least one thermally reversible non-covalently bonded unit that includes a two or more centered H-bonds within that unit, and said second polymer is a polyvinyl acetal in which at least 50% of the recurring units are acetal units, wherein the weight ratio of said first polymer to said second polymer is from about 1:1 to about 15:1, and said imageable element having been prepared by applying said imageable layer to said substrate followed by a heat treatment at from about 50 to about 70° C. for at least 24 hours while said imageable element is wrapped in a water-impermeable sheet material.

* * * * *